United States Patent
De Waegeneer et al.

(10) Patent No.: US 10,365,837 B2
(45) Date of Patent: Jul. 30, 2019

(54) AUTOMATIC RAID PROVISIONING

(71) Applicant: Amplidata N.V., Ghent (BE)

(72) Inventors: Wim De Waegeneer, Ghent (BE); Timothy Demulder, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/243,692

(22) Filed: Aug. 22, 2016

(65) Prior Publication Data

US 2018/0052623 A1   Feb. 22, 2018

(51) Int. Cl.
*G06F 3/06* (2006.01)
*G06F 16/18* (2019.01)

(52) U.S. Cl.
CPC .......... *G06F 3/0619* (2013.01); *G06F 3/0604* (2013.01); *G06F 3/0644* (2013.01); *G06F 3/0665* (2013.01); *G06F 3/0689* (2013.01); *G06F 16/18* (2019.01)

(58) Field of Classification Search
None
See application file for complete search history.

(56) References Cited

U.S. PATENT DOCUMENTS

| | | | |
|---|---|---|---|
| 6,119,131 A | 9/2000 | Cabrera et al. | |
| 7,000,231 B1 * | 2/2006 | Gold | G06F 8/63 711/173 |
| 7,107,534 B1 * | 9/2006 | de Jong | H04L 41/22 715/734 |
| 7,418,439 B2 * | 8/2008 | Wong | G06F 11/2069 |
| 7,454,566 B1 | 11/2008 | Overby | |
| 7,475,278 B2 * | 1/2009 | Dickenson | G06F 11/1417 711/113 |
| 7,574,623 B1 * | 8/2009 | Goel | G06F 11/008 714/47.2 |
| 9,213,611 B2 | 12/2015 | Ludwig et al. | |
| 2004/0250014 A1 * | 12/2004 | Sohn | G06F 3/0608 711/112 |
| 2008/0098386 A1 * | 4/2008 | Leung | G06F 8/63 717/174 |
| 2013/0304705 A1 * | 11/2013 | Wong | G06F 17/30129 707/655 |
| 2016/0139834 A1 * | 5/2016 | Hanson | H04L 67/30 711/114 |
| 2017/0060975 A1 * | 3/2017 | Akyureklier | G06F 17/30575 |
| 2017/0212772 A1 * | 7/2017 | Wilkinson | G06F 9/4451 |
| 2017/0235512 A1 * | 8/2017 | Ruchita | G06F 3/0632 711/170 |

OTHER PUBLICATIONS

International Search Report and Written Opinion, PCT/IB2017/053501, dated Sep. 25, 2017 (12 pages).

* cited by examiner

*Primary Examiner* — Kaushikkumar M Patel
(74) *Attorney, Agent, or Firm* — Patent Law Works LLP (57) ABSTRACT

Systems and methods for automatic provisioning of a redundant array of independent disks (RAID) are disclosed. In particular, the systems and methods include automatically determining, using one or more processors, that a first partition associated with a first storage device and a second partition associated with a second storage device are associated with a common mount point; and automatically adding, using the one or more processors, the first partition and the second partition to a RAID.

20 Claims, 4 Drawing Sheets

AUTOMATIC RAID PROVISIONING

FIELD OF THE INVENTION

The present disclosure relates to provisioning digital storage devices. In particular, the present disclosure relates to systems and methods of automatic redundant array of independent disks (RAID) provisioning.

BACKGROUND

A redundant array of independent disks (RAID) combines multiple physical storage devices, or partitions thereof, into a single logical unit in order to provide redundancy, improved performance, improved availability, or a combination thereof. Provisioning of storage devices (e.g., disks) and creation or modification of a RAID using existing solutions is error-prone. Errors such as user errors inputting static information are not uncommon. Accordingly, a model-based approach that minimizes the amount of input and intervention a user needs to provide may be desirable.

Additionally, difficulties arise when a storage device that is part of a RAID is replaced, particularly when the replacement storage device is a different size and/or model type. Accordingly, a mechanism that reduces the difficulties associated with reassembling a RAID when a storage device is replaced may be desirable.

At least one system and method are disclosed herein that address one or more of the aforementioned issues.

SUMMARY

Systems and methods for automatic redundant array of independent disks (RAID) provisioning are disclosed. For example, in some implementations, a system includes one or more processors and a memory storing instructions that cause the system to: automatically determine that a first partition associated with a first storage device and a second partition associated with a second storage device are associated with a common mount point; and automatically add the first partition and the second partition to a RAID.

These and other implementations may each optionally include one or more of the following features, such as: receiving a role of the first storage device, determining a first partition template based on the role of the first storage device, and applying the first partition template to the first storage device; receiving a role of a second storage device, determining a second partition template based on the role of the second storage device, and applying the second partition template to the second storage device; the first partition template defining one or more partitions and a mount point associated with each of the one or more partitions; automatically determining that a third partition associated with a third storage device is associated with the common mount point, and automatically adding the third partition to the RAID; the third storage device replacing one of the first storage device and the second storage device and the addition of the third partition to the RAID re-assembling the RAID; the third storage device being in addition to the first storage device and the second storage device.

Other implementations of one or more of these aspects include corresponding systems, apparatus, methods, and computer programs, configured to perform the actions of the methods, encoded on computer storage devices. It should be understood that the above is not all-inclusive and many additional steps, features and advantages are contemplated and fall within the scope of the present disclosure. Moreover, it should be understood that the language used in the present disclosure has been principally selected for readability and instructional purposes and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Various systems and methods for automatic redundant array of independent disks (RAID) provisioning are disclosed. While the systems and methods of the present disclosure are described in the context of a particular system architecture, it should be understood that the systems and methods can be applied to other architectures and organizations of hardware.

Figure 1:
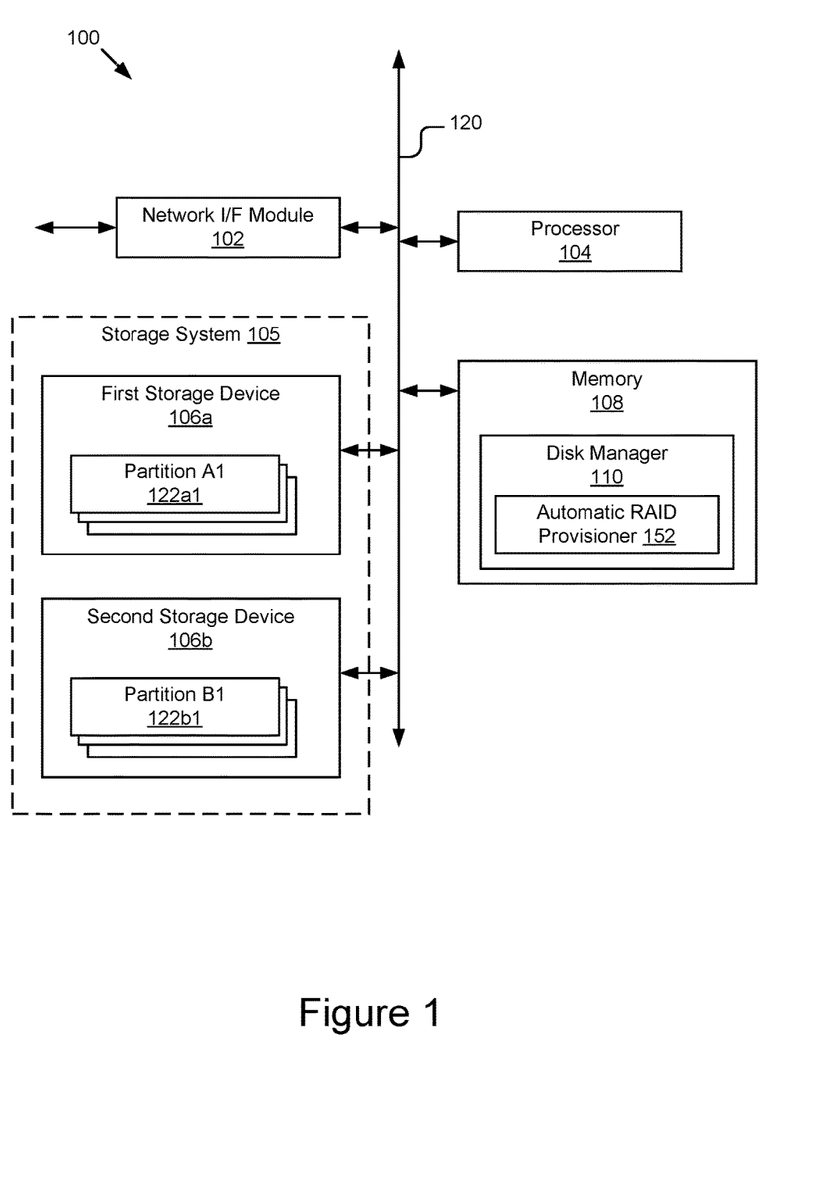
FIG. 1 is a block diagram illustrating an example system configured to automatically provision a redundant array of independent disks (RAID).

FIG. 1 is a block diagram illustrating an example system 100 configured to implement the techniques introduced herein. The system 100 may be any computing device including one or more memory and one or more processors (for example, a server computer, a laptop computer, a desktop computer, etc.).

The system 100 may include a network interface (I/F) module 102, a processor 104, a storage system 105, and a memory 108. The components of the system 100 are communicatively coupled to a bus or software communication mechanism 120 for communication with each other.

In some implementations, software communication mechanism 120 may be an object bus (e.g., Common Object Request Broker Architecture (CORBA)), direct socket communication (e.g., Transmission Control Protocol/Internet Protocol (TCP/IP) sockets) among software modules, remote procedure calls, User Datagram Protocol (UDP) broadcasts and receipts, Hypertext Transfer Protocol (HTTP) connections, function or procedure calls, etc. Further, any or all of the communication could be secure (Secure Shell (SSH), HTTP Secure (HTTPS), etc.). The software communication mechanism 120 can be implemented on any underlying hardware (for example, a network, the Internet, a bus, a combination thereof, etc.).

The network interface (I/F) module 102 is configured to connect system 100 to a network and/or other system. For example, network interface module 102 may enable communication through one or more of the Internet, cable networks, and wired networks. The network interface module 102 links the processor 104 to a network that may in turn be coupled to other processing systems (e.g., a client device, a server device). The network interface module 102 also provides other conventional connections to the network for distribution and/or retrieval of files and/or media objects using standard network protocols such as, but not limited to, TCP/IP, HTTP, HTTPS and Simple Mail Transfer Protocol (SMTP) as will be understood. In some implementations, the network interface module 102 includes a transceiver for sending and receiving signals using Wi-Fi, Bluetooth®, or cellular communications for wireless communication.

The network interface module 102 may allow a client and/or a server device to store data to and retrieve data from the storage system 105 (for example, across a network). For example, the network interface module 102 may allow one or more components of the system 100 to act as network accessed storage or as an array of storage devices.

The network can be one of a conventional type, wired or wireless, and may have numerous different configurations including a star configuration, token ring configuration, or other configurations. Furthermore, the network may include a local area network (LAN), a wide area network (WAN) (e.g., the Internet), and/or other interconnected data paths across which multiple devices may communicate. In some implementations, the network may be a peer-to-peer network. The network may also be coupled with or include portions of a telecommunications network for sending data using a variety of different communication protocols. In some implementations, the network may include Bluetooth (or Bluetooth low energy) communication networks or a cellular communications network for sending and receiving data including via short messaging service (SMS), multimedia messaging service (MMS), HTTP, direct data connection, wireless application protocol (WAP), email, etc.

The processor 104 may include an arithmetic logic unit, a microprocessor, a general purpose controller or some other processor array to perform computations and provide electronic display signals to a display device. In some implementations, the processor 104 is a hardware processor having one or more processing cores. The processor 104 is coupled to the bus 120 for communication with the other components of system 100. Processor 104 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 1, multiple processors and/or processing cores may be included. It should be understood that other processor configurations are possible.

The memory 108 stores instructions and/or data that may be executed by the processor 104. The memory 108 is coupled to the bus 120 for communication with the other components of the system 100. The instructions and/or data stored in the memory 108 may include code for performing any and/or all of the techniques described herein. The memory 108 may be, for example, volatile memory such as a dynamic random access memory (DRAM) device, a static random access memory (SRAM) device, or some other volatile memory devices. In some implementations, the memory 108 also includes a non-volatile memory or similar permanent storage device and media (for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device). In some implementations, the memory 108 stores a disk manager 110. In the illustrated implementation, the disk manager 110 includes an automatic RAID provisioner 152.

The storage system 105 is a data storage system that may store information on any type of attached array of writable storage media, occasionally referred to herein as "storage device" in the singular or "storage devices" in the plural. Examples of storage devices include, but are not limited to, magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks of hard disk drives (HDDs). FIG. 1 illustrates a first storage device 106a and a second storage device 106b. Reference to a storage device 106 or storage devices 106 (without the 'a' or 'b' identifier appended to 106 and/or without being preceded by "first" or "second") is referring to a general instance or instances of a storage device 106. The storage system 105 may include one or more enclosures housed in the same location or physically distributed to disparate locations across a storage area network. The storage devices 106 are partitioned into one or more partitions 122.

Figure 2:
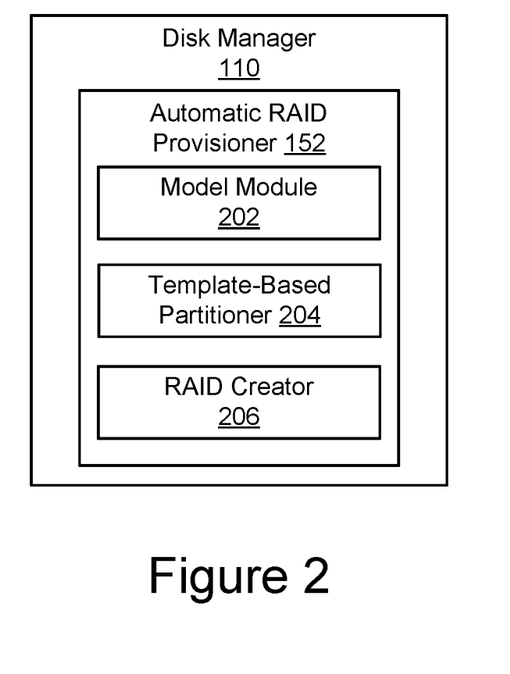
FIG. 2 is a block diagram illustrating an example automatic RAID provisioner according to one implementation.

FIG. 2 is a block diagram illustrating an example automatic RAID provisioner 152 according to one implementation. In the illustrated implementation, the automatic RAID provisioner 152 includes a model module 202, a template-based partitioner 204 and a RAID creator 206. However, it should be recognized that FIG. 2 is merely one implementation. Other implementations may include different components or organizations.

The model module 202 manages one or more models. Management of a model may include one or more of creating a model, receiving a role and identifying a model associated with that role, and identifying, based on the model, a template associated with that role.

In one implementation, a model defines a template associated with a role of a storage device 106 in the system 100. A template, also referred to herein as a "partition template," defines one or more partitions to be provisioned to a storage device 106 when the template is applied. In some implementations, a model may be user-created and/or modifiable. For example, in one implementation, the model module 202 may receive user input (e.g., via a command line interface or graphical user interface (GUI)) creating a model that defines a template including 'grub,' 'root,' 'swap,' 'var' and 'meta' partitions and each partition's mount point and size associated with an "operating system disk with an additional partition for metadata" role. In some implementations, a model may be preset (e.g., hardcoded or as a default).

In some implementations, the template defines a size for one or more of the partitions to be provisioned. In some implementations, a size of a partition may be proportional (e.g., a percentage of the total size of the storage device 106 being provisioned). In some implementations, a size of a partition may be absolute (e.g., a given number of bytes). In some implementations, a size of a partition may be constrained (e.g., the partition may have a minimum size, a maximum size or both).

The model module 202 receives a role of a storage device 106 and determines, using a model, a predefined partition template associated with that role. In some implementations, the model module 202 receives a role of a storage device 106 from a user. For example, in some implementations, the model module 202 receives input (e.g., via a command line interface or GUI) identifying the first storage device 106a as having a role of an "operating system disk with an additional partition for metadata." In some implementations, the model module 202 receives a role of a storage device 106 by automatically determining (e.g., via heuristics or rules) the role of the storage device 106. For example, assume that the first storage device 106*a* is an empty HDD. In some implementations, the model module 202 determines that the role of the first storage device 106*a* is as an "operating system disk with an additional partition for metadata," which is associated with a template (e.g., the template with the 5 partitions described above).

The template-based partitioner 204 applies a template to a storage device 106. For example, assume that the first storage device 106*a* and the second storage device 106*b* are two empty HDDs to be provisioned. Also, assume that the model module 202 determines that the role of the first storage device 106*a* is as an "operating system disk with an additional partition for metadata" and the role of the second storage device 106*b* is as an "operating system disk with an additional partition for metadata." In one implementation, the template-based partitioner 204 applies a template including 'grub,' 'root,' 'swap,' 'var' and 'meta' partitions and each partition's mount point and size. For example, the template-based partitioner 204 populates a disk partition layout for the first storage device 106*a* as:

```
{'buslocation': 'sg1',
'device': 'sda',
'disktype': 'HDD',
'serial': 'HARDDISK__VBedf551cb-d6d08cb2',
'size': 122880,
'partition': [
    {'label': 'grub', 'mountpoint': '', 'partbegin': 1, 'partend': 512, 'partnumber': 1}
    {'label': 'root', 'mountpoint': '/', 'partbegin': 512, 'partend': 25003, 'partnumber': 2},
    {'label': 'swap', 'mountpoint': 'swap', 'partbegin': 25003, 'partend': 27003, 'partnumber': 3},
    {'label': 'var', 'mountpoint': '/var', 'partbegin': 27003, 'partend': 77003, 'partnumber': 4},
    {'label': 'meta', 'mountpoint': '/mnt/metal', 'partbegin': 77003, 'partend': 122879, 'partnumber': 5}]
```

And, the template-based partitioner 204 populates a disk partition layout for the second storage device 106*b* as:

```
{'buslocation': 'sg2',
'device': 'sdb',
'disktype': 'HDD',
'serial': 'HARDDISK__VBd9d5a5eb-7ab69280',
'size': 122880,
'partition': [
    {'label': 'grub', 'mountpoint': '', 'partbegin': 1, 'partend': 512, 'partnumber': 1}
    {'label': 'root', 'mountpoint': '/', 'partbegin': 512, 'partend': 25003, 'partnumber': 2},
    {'label': 'swap', 'mountpoint': 'swap', 'partbegin': 25003, 'partend': 27003, 'partnumber': 3},
    {'label': 'var', 'mountpoint': '/var', 'partbegin': 27003, 'partend': 77003, 'partnumber': 4},
    {'label': 'meta', 'mountpoint': '/mnt/meta2', 'partbegin': 77003, 'partend': 122879, 'partnumber': 5}]
```

The RAID creator 206 determines whether two partitions are associated with a common mount point and creates a RAID for these partitions rather than indicating an error as existing systems would. For example, the RAID creator 206 detects that multiple partitions in the example above have the same mount point, so the RAID creator 206 creates a level 1 RAID for those partitions and updates the disk layout to remove the duplicate mount points. For example, the RAID creator 206 creates a RAID 'md0' for mount point '/' on the second partition of both disks:

```
{'device': 'md0',
'label': 'root',
'members': ['/dev/sdb2', '/dev/sda2'],
'mountpoint': '/',
'status': 'ONLINE',
'uuid': '653ec1d4-5e63-4ef8-8215-7857976a0dd2'}
```

The RAID creator 206 creates a RAID 'md1' created for mount point '/var' on the fourth partition of both disks:

```
{'device': 'md1',
'label': 'var',
'members': ['/dev/sdb4', '/dev/sda4'],
'mountpoint': '/var',
'status': 'ONLINE',
'uuid': '3542289a-9a43-4a73-908c-ba26a7bdc86d'}
```

The RAID creator 206 creates a RAID 'md2' for a mirror swap for mount point 'swap' on the third partition of both disks:

```
{'device': 'md2',
'label': 'swap',
'members': ['/dev/sdb3', '/dev/sda3'],
'mountpoint': 'swap',
'status': 'ONLINE',
'uuid': 'f455e7f0-b9a7-4791-9b4d-1122ee2cb666'}
```

Disk Resources:

```
{'buslocation': 'sg1',
'device': 'sda',
'disktype': 'HDD',
'serial': 'HARDDISK__VBedf551cb-d6d08cb2',
'size': 122880,
'partition': [
    {'label': 'grub', 'mountpoint': '',   'partbegin': 1, 'partend': 512, 'partnumber': 1}
    {'label': 'root', 'mountpoint': '',   'partbegin': 512, 'partend': 25003, 'partnumber': 2},
    {'label': 'swap', 'mountpoint': '',   'partbegin': 25003, 'partend': 27003, 'partnumber': 3},
    {'label': 'var', 'mountpoint': '',   'partbegin': 27003, 'partend': 77003, 'partnumber': 4},
    {'label': 'meta', 'mountpoint': '/mnt/metal', 'partbegin': 77003, 'partend': 122879, 'partnumber': 5}]
    {'buslocation': 'sg2',
'device': 'sdb',
'disktype': 'HDD',
'serial': 'HARDDISK__VBd9d5a5eb-7ab69280',
'size': 122880,
'partition': [
    {'label': 'grub', 'mountpoint': '',   'partbegin': 1, 'partend': 512, 'partnumber': 1}
    {'label': 'root', 'mountpoint': '',   'partbegin': 512, 'partend': 25003, 'partnumber': 2},
    {'label': 'swap', 'mountpoint': '',   'partbegin': 25003, 'partend': 27003, 'partnumber': 3},
    {'label': 'var', 'mountpoint': '',   'partbegin': 27003, 'partend': 77003, 'partnumber': 4},
    {'label': 'meta', 'mountpoint': '/mnt/meta2', 'partbegin': 77003, 'partend': 122879, 'partnumber': 5}]
```

In one implementation, after the automatic modeling, the RAID user, via the RAID creator 206, may modify or remove the proposed RAIDs before provisioning the actual system. The provisioning first deploys the partition layout on the disks (using the template-based partitioner 204) and then creates (using the RAID creator 206) the modeled RAIDs. The example above is merely an example of automatically creating an array and is provided for clarity and convenience. It should be recognized that other examples exist and are within the scope of this disclosure.

In some implementations, the automatic RAID provisioner 152 may add additional disks, or partitions thereof, to an existing RAID. For example, continuing the example discussed above, assume a new storage device 106 (e.g., a third HDD) is added to the system 100 (not shown). Also assume the model module 202 determines that the new storage device may have a role of "operating system disk" and, based on the model, the partition template defines the following partition layout, which is implemented by the template-based partitioner 204:

```
{'buslocation': 'sg3',
 'device': 'sdc',
 'disktype': 'HDD',
 'serial': 'HARDDISK__VBedf551cb-f8sd199d',
 'size': 200000,
 'partition': [
    {'label': 'grub', 'mountpoint': '',   'partbegin': 1, 'partend': 512, 'partnumber': 1}
    {'label': 'root', 'mountpoint': '/',  'partbegin': 512, 'partend': 25003, 'partnumber': 2},
    {'label': 'meta', 'mountpoint': '/mnt/meta3', 'partbegin': 77003, 'partend': 200000, 'partnumber': 3}]
```

In some implementations, the RAID creator 206 again detects a duplicate mount point (i.e. '/'), but now between an existing RAID (e.g., md0) and a storage device 106 not currently in the RAID (e.g., sdc) instead of between two storage devices 106 not in a RAID (e.g., prior to the creation of the RAID md0). The RAID creator 206 automatically adds the partition associated with the duplicate mount point to the existing RAID.

```
RAID resource:
    {'device': 'md0',
     'label': 'root',
     'members': ['/dev/sdb2', '/dev/sda2', 'dev/sdc2'],
     'mountpoint': '/',
     'status': 'ONLINE',
     'uuid': '653ec1d4-5e63-4ef8-8215-7857976a0dd2'},
```

Disk resource: mount point'/' is removed from the second partition of disk 'sdc'

```
{'buslocation': 'sg3',
 'device': 'sdc',
 'disktype': 'HDD',
 'serial': 'HARDDISK__VBedf551cb-f8sdf99d',
 'size': 200000,
 'partition': [
    {'label': 'grub', 'mountpoint': '',  'partbegin': 1, 'partend': 512, 'partnumber': 1}
    {'label': 'root', 'mountpoint': '',  'partbegin': 512, 'partend': 25003, 'partnumber': 2},
    {'label': 'meta', 'mountpoint': '/mnt/meta3', 'partbegin': 77003, 'partend': 200000, 'partnumber': 3}]
```

In some implementations, the automatic RAID provisioner 152 may re-assemble a RAID when a storage device 106 (e.g., a disk) is replaced even when the new storage device does not exactly match the original storage device 106 being replaced in one or more of size and model type. In some implementations, the re-assembly of a RAID is similar to the addition of an additional storage device 106 except that a storage device 106 that was already provisioned and included in the array is physically removed from the system and the one or more RAIDs to which the storage device 106 belonged.

Figure 3:
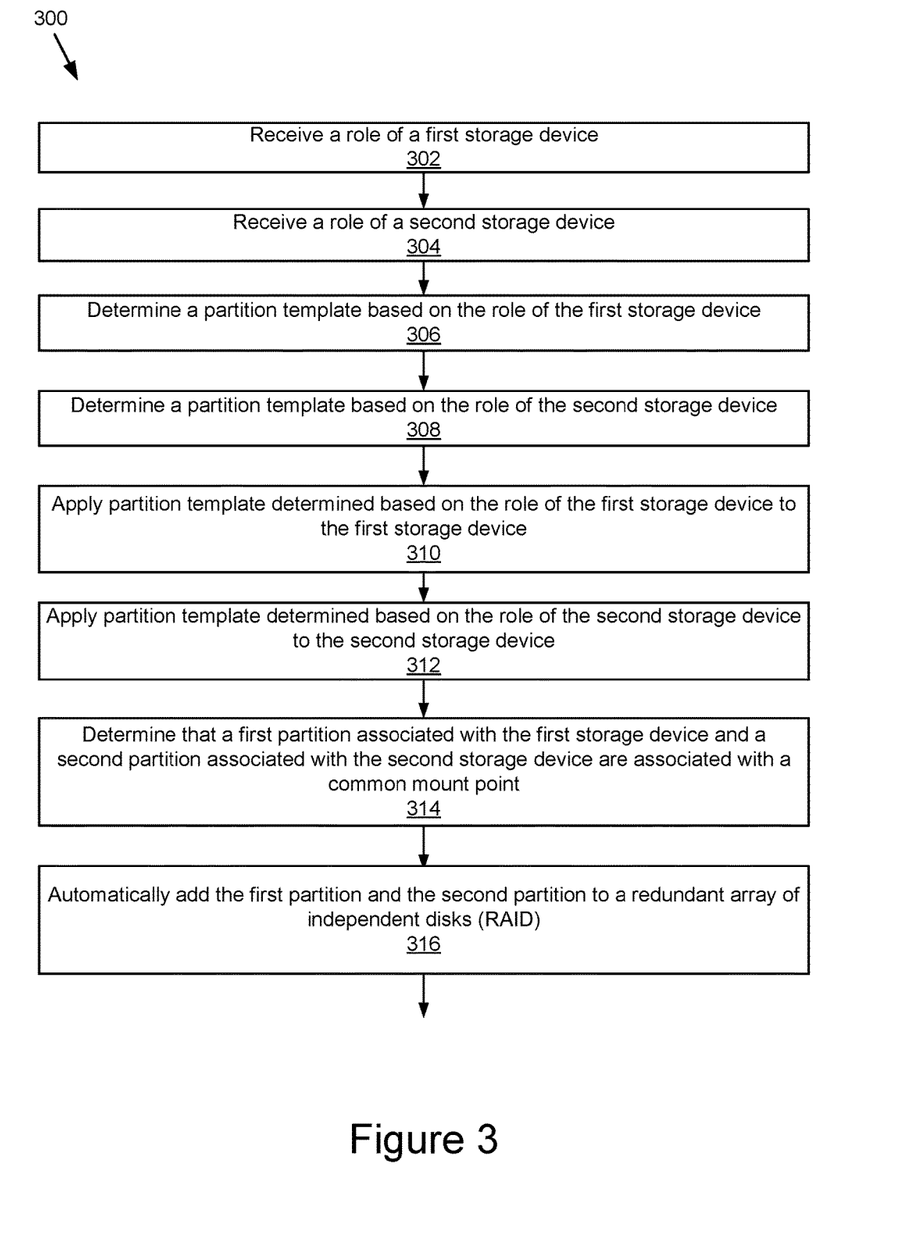
FIG. 3 is a flowchart depicting an example method for automatic RAID provisioning according to the techniques described herein.
Figure 4:
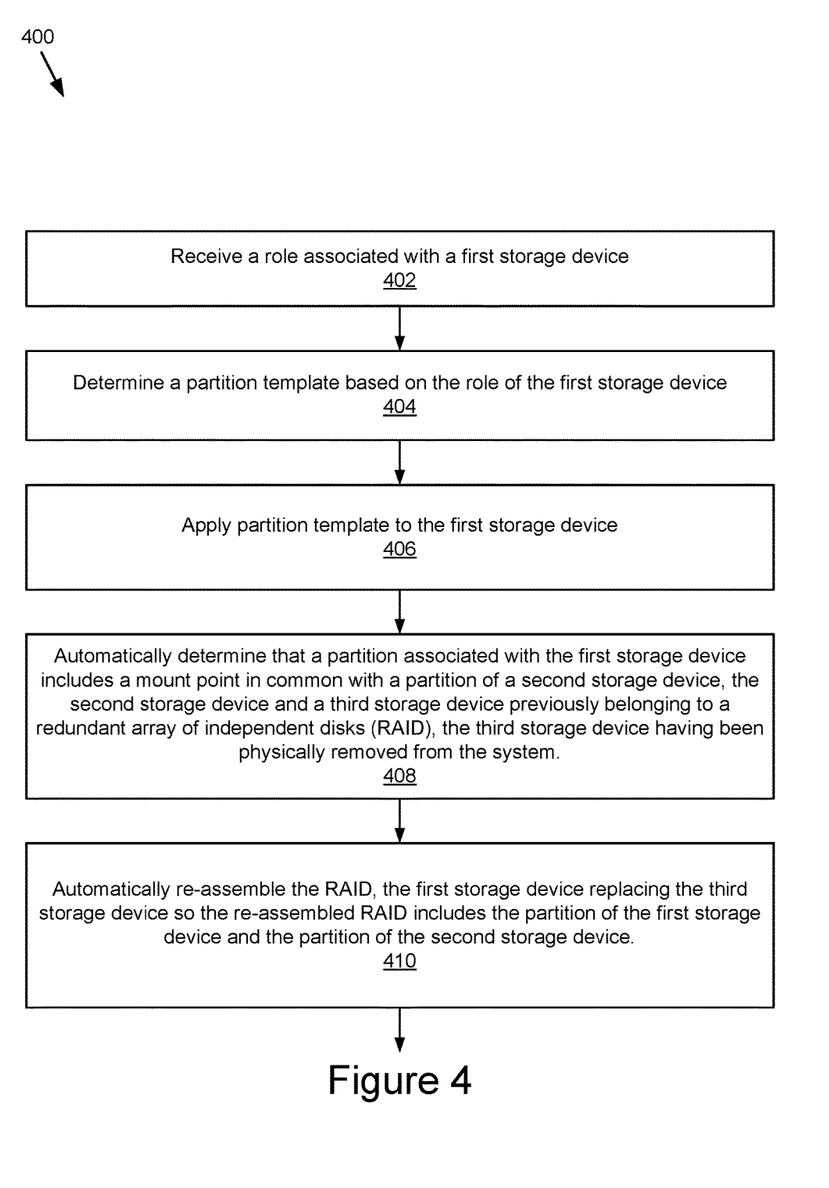
FIG. 4 is a flowchart depicting an example method for automatic re-assembly of a RAID array according to the techniques described herein.

FIGS. 3 and 4 are example methods that may be performed by the system of FIGS. 1 and 2 according to one implementation. It should be recognized, however, that the methods of FIGS. 3 and 4 are merely examples, and the disclosure herein applies to other methods which may include additional, fewer or different steps and may perform those steps in a different order.

FIG. 3 is a flowchart of an example method 300 for automatic RAID provisioning according to one implementation. At 302, the model module 202 of the automatic RAID provisioner 152 receives a role of a first storage device 106a. At 304, the model module 202 receives a role of a second storage device 106b. At 306, the model module 202 determines a partition template based on the role of the first storage device 106a. At 308, the model module 202 determines a partition template based on the role of the second storage device 106b. At 310, the template-based partitioner 204 applies the partition template, which is determined based on the role of the first storage device 106a, to the first storage device 106a. At 312, the template-based partitioner 204 applies the partition template, which is determined based on the role of the second storage device 106b, to the second storage device 106b. At 314, the RAID creator 206 determines that a first partition associated with the first storage device (e.g., Partition A1 122a1) and a second partition associated with the second storage device (e.g., Partition B1 122b1) are associated with a common mount point. At 316, the RAID creator 206 automatically adds the first partition associated with the first storage device (e.g., Partition A1 122a1) and the second partition associated with the second storage device (e.g., Partition B1 122b1) associated with a common mount point to a RAID.

FIG. 4 is a flowchart of an example method 400 for automatic re-assembly of a RAID according to one implementation. At 402, the model module 202 of the automatic RAID provisioner 152 receives a role associated with a first storage device 106a. At 404, the model module 202 determines a partition template based on the role of the first storage device 106a. At 406, the template-based partitioner 204 applies the partition template, which is determined based on the role of the first storage device 106a, to the first storage device 106a. At 408, the RAID creator 206 automatically determines that a partition associated with the first storage device includes a mount point in common with a partition of a second storage device, the second storage device and a third storage device previously belonging to a RAID, the third storage device having been physically removed from the system. At 410, the RAID creator 206 automatically re-assembles the RAID, where the first storage device replaces the third storage device so the re-assembled RAID includes the partition of the first storage device and the partition of the second storage device.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above may be presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), Erasable Programmable Read-Only Memories (EPROMs), Electrically Erasable Programmable Read-Only Memories (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method, comprising:
    automatically determining, using one or more processors, that a first partition associated with a first storage device and a second partition associated with a second storage device are associated with a common mount point; and
    automatically adding, using the one or more processors, the first partition and the second partition to a redundant array of independent disks (RAID).

2. The computer-implemented method of claim 1, further comprising:
    determining, based on the role of the first storage device, a first partition template; and
    applying the first partition template to the first storage device.

3. The computer-implemented method of claim 2, further comprising:
    determining, based on the role of the second storage device, a second partition template; and
    applying the second partition template to the second storage device.

4. The computer-implemented method of claim 2, wherein the first partition template defines one or more partitions and corresponding mount points associated with the one or more partitions.

5. The computer-implemented method of claim 1, further comprising:
    automatically determining that a third partition associated with a third storage device is associated with the common mount point; and
    automatically adding the third partition to the RAID.

6. The computer-implemented method of claim 5, further comprising: re-assembling, responsive to automatically adding the third partition to the RAID, the RAID, wherein the third storage device replaces one of the first storage device and the second storage device.

7. The computer-implemented method of claim 5, wherein the third storage device is in addition to the first storage device and the second storage device.

8. A system, comprising:
    a processor; and
    a non-transitory computer usable medium storing instructions that, when executed by the processor, cause the system to:
        automatically determine that a first partition associated with a first storage device and a second partition associated with a second storage device are associated with a common mount point; and
        automatically add the first partition and the second partition to a redundant array of independent disks (RAID).

9. The system of claim 8, wherein the instructions, when executed by the processor, further cause the system to:
    determine, based on the role of the first storage device, a first partition template; and
    apply the first partition template to the first storage device.

10. The system of claim 9, wherein the instructions, when executed by the processor, further cause the system to:
    determine, based on the role of the second storage device, a second partition template; and
    apply the second partition template to the second storage device.

11. The system of claim 9, wherein the first partition template defines one or more partitions and corresponding mount points associated with the one or more partitions.

12. The system of claim 8, wherein the instructions, when executed by the processor, further cause the system to:
    automatically determine that a third partition associated with a third storage device is associated with the common mount point; and
    automatically add the third partition to the RAID.

13. The system of claim 12, wherein the instructions, when executed by the processor, further cause the system to:
    re-assemble, responsive to automatically adding the third partition to the RAID, the RAID, wherein the third storage device replaces one of the first storage device and the second storage device.

14. The system of claim 12, wherein the third storage device is in addition to the first storage device and the second storage device.

15. A system, comprising:
    one or more processors;
    one or more memories;
    means for automatically determining that a first partition associated with a first storage device and a second partition associated with a second storage device are associated with a common mount point; and
    means for automatically adding the first partition and the second partition to a redundant array of independent disks (RAID).

16. The system of claim 15, further comprising:
    means for determining, based on a role of the first storage device, a first partition template; and
    means for applying the first partition template to the first storage device.

17. The system of claim 16, further comprising:
    means for determining, based on a role of the second storage device, a second partition template; and
    means for applying the second partition template to the second storage device.

18. The system of claim 16, wherein the first partition template defines one or more partitions and corresponding mount points associated with the one or more partitions.

19. The system of claim 15, further comprising:
    means for automatically determining that a third partition associated with a third storage device is associated with the common mount point; and
    means for automatically adding the third partition to the RAID.

20. The system of claim 19, further comprising:
    means for re-assembling, responsive to automatically adding the third partition to the RAID, the RAID, wherein the third storage device replaces one of the first storage device and the second storage device.

* * * * *